3,138,532
WATER-DISPERSIBLE GELATIN COMPOSITIONS CONTAINING FAT-SOLUBLE VITAMIN-ACTIVE MATERIAL, AND PREPARATION OF DROPLETS AND BEADLETS

Ronald Eugene Aiello, Belleville, and Philip Pierre Eisenstein, Hazlet, N.J., assignors to Hoffmann-La Roche Inc., Nutley, N.J., a corporation of New Jersey
No Drawing. Filed Apr. 2, 1962, Ser. No. 184,600
16 Claims. (Cl. 167—81)

The present invention relates to water-dispersible gelatin compositions. More particularly, it relates to cold water-dispersible gelatin compositions containing vitamin-active material.

Gelatin compositions containing vitamin-active materials in the form of beadlets and processes for their preparation are well known to the art. For many applications, cold water-dispersible beadlets are desirable. However, heretofore gelatin compositions containing vitamin-active materials were either water-insoluble or water-dispersible with insoluble residues which tend to clog filtering apparatuses or leave a scum on the surface of the water.

The present invention relates to a water-dispersible gelatin product containing fat-soluble vitamin-active materials which are dispersible in cold water without leaving any residues.

The water-dispersible gelatin compositions of the invention contain at least the following two ingredients:

(1) From about 25% to about 97%, preferably about 30% to about 65% by weight of the reaction product of (a) gelatin and (b) from about 10 to about 50 parts, preferably about 20 to about 40 parts, of either ascorbic acid, a mixture of ascorbic acid and citric acid, or a mixture of citric acid and sorbose, per 100 parts of gelatin. When a mixture of ascorbic acid and citric acid is used, the mixture contains no less than about 10 parts of ascorbic acid with the remainder citric acid. When a mixture of citric acid and sorbose is used, the mixture contains at least 20 parts of citric acid and at least 10 parts of sorbose.

(2) From about 3% to about 35%, preferably about 10% to about 30% of a fat-soluble vitamin-active material. The fat-soluble vitamin-active material can include one or more of the following: vitamin A, a vitamin D, vitamin E, a vitamin K, a carotenoid such as $\beta$-carotene, and esters of the preceding compounds, natural fish oils rich in oil-soluble vitamins, etc.

An optional but preferred ingredient is from about 1 to about 40%, preferably about 25 to about 40% of a plasticizer. Plasticizers which can be employed are those commonly used with gelatin compositions of fat-soluble vitamin-active materials such as pharmaceutically acceptable polyhydric alcohols, e.g. sorbitol, corn syrup, invert sugar, sucrose solution, glycerine, dextrin, etc., with corn syrup preferred.

During the preparation of the gelatin compositions of the invention, the pH of the aqueous phase of the emulsion is controlled by means of a buffering agent such as sodium citrate; and accordingly, small quantities of a buffering agent will be present in the final compositions.

Any gelatin which has a bloom in the range of about 30 to about 100, preferably about 40 to about 60, can be employed in the instant compositions. Both type A and type B gelatin can be employed, although type B gelatin is preferred.

Small quantities of other ingredients can optionally be employed, such as for example antioxidants, e.g., butylated hydroxy anisol, butylated hydroxy toluene; chelating agents, e.g. EDTA; reducing agents, e.g. sodium bisulfite; coloring agents; etc.

The process of the invention is carried out by heating together at a temperature in the range of about 50 to about 85° C., preferably about 65 to about 80° C. an aqueous gelatin solution containing about 30 to about 70%, preferably about 40 to about 60% gelatin with from about 10 to about 50, preferably about 20 to about 40 parts of ascorbic acid per 100 parts by weight of gelatin. The above temperature range is not critical, and temperatures down to about 40° C. cvan be used, but the heating time, which is normally in the range of about 4 to about 12 hours, must be extended much longer than this, e.g. of the order of a week or more. The heating time depends on various factors, e.g. the physical characteristics of the gelatin and the amount of ascorbic acid present. Normally, the higher the bloom of the gelatin and the less the amount of ascorbic acid present, the longer the heating time that must be employed. Also, the above concentration of the aqueous gelatin solution is not critical, and percentages down to 15% gelatin can be employed, but the excess water present would have to be removed afterwards prior to the spraying step, i.e. to bring the gelatin concentration in the aqueous solution to at least about 30%.

In place of ascorbic acid, either (a) from about 10 to about 50 parts, preferably about 20 to about 40 parts of a mixture of ascorbic acid and citric acid containing at least 10 parts of ascorbic acid, or (b) from about 10 to about 50 parts, preferably about 20 to about 40 parts of a mixture of citric acid and sorbose containing at least 20 parts of citric acid and 10 parts of sorbose can be employed. However, ascorbic acid alone is preferred.

The pH of the above solution is maintained in the range of about 3.5 to about 7, preferably about 3.8 to about 5.5 by means of a pharmaceutically acceptable buffering agent such as sodium citrate.

A fat-soluble vitamin-active material is then added to the above solution at a temperature in the range of about 40° to about 85° C. in a homogenizer capable of forming an oil and water emulsion. The vitamin-active material is added in a quantity ranging from about 3 to about 35 weight percent based on the dry weight of the water-dispersible gelatin composition. A plasticizer which is an optional but preferred ingredient can also be added to the emulsion or can be added to the aqueous solution prior to formation of the emulsion. From about 1 to about 40, preferably about 25 to about 40% of a plasticizer can be employed.

Small quantities of other ingredients such as the above mentioned antioxidants, chelating agents, reducing agents, coloring agents, etc., can also be added to the emulsion.

The above emulsion is then formed into droplets by any spraying apparatus used in the art such as a two-phase atomizing nozzle, rotary wheel, etc. The droplets are formed above the surface of an alcohol catch and allowed to enter the alcohol catch by the pull of gravity. The alcohol catch can be ethyl alcohol or isopropyl alcohol and can contain up to about 5% water. Anhydrous alcohol can be employed, although for practical considerations 95% ethyl alcohol and 99% isopropyl alcohol are preferred. The temperature of the alcohol is maintained in the range of about −50° to about +20° C. If the temperature of the catch is maintained below about 0° C., the droplets will tend to freeze, and dehydration will not occur until the temperature is raised to about 0° or above. Accordingly, if temperatures below 0° C. are employed, the temperature of the catch is then raised to at least 0°, preferably in the range of about 10 to about 20° C. so that dehydration of the beadlets occurs. Alternatively, the frozen beadlets can be removed from the catch and dehydrated in a fresh ethyl alcohol or isopropyl alcohol bath maintained above about 0° C., preferably about 10 to about 20° C. A sufficient quantity of alcohol necessary to dehydrate the beadlets is about twenty liters of alcohol per liter of water in the emulsion, as a minimum. Any quantity greater than this can of course be employed. Agitation of the alcohol is highly desirable during the dehydration step to prevent agglomeration of the beadlets. The droplets are left in the catch or in the fresh bath until dehydration occurs, i.e. until the beadlets become hard. The length of time for this to occur will depend on several factors, such as the temperature of the catch, the amount of water vapor in the atmosphere, the amount of water in the emulsion, etc. After the beadlets become hard, they are separated from the catch by any suitable technique such as centrifuging, filtering, etc. The beadlets are then washed with alcohol, i.e. ethyl alcohol or isopropyl alcohol, and then dried, preferably in a vacuum oven. The beadlets are then preferably dusted with a dusting agent such as dicalcium phosphate to prevent sticking. The resulting product is dispersible in cold water without leaving any residue.

The product is very stable and can be added to the drinking water of economically useful animals to supply supplementary vitamins to them. Since water administration to animals is frequently automated, the clear solutions formed from the instant products do not clog the mechanical volume and mixing devices with insoluble suspended particles.

The invention will be better understood by reference to the following examples which are given for illustrative purposes only and are not meant to limit the invention.

*Example 1*

The following ingredients are employed:

| Ingredients: | Weight in grams |
| --- | --- |
| Gelatin, 40 bloom, type B, 50% solution | 10.98 |
| Ascorbic acid, coarse | 1.65 |
| Sodium citrate | 0.57 |
| Vitamin A palmitate | 3.00 |
| Corn syrup, 80% solids | 7.37 |
| Caramel color | 0.02 |
| Butylated hydroxy toluene | 0.66 |

The gelatin and ascorbic acid are heated together for about five hours at 80° C. Then the sodium citrate, corn syrup, butylated hydroxy toluene, and caramel color are added, followed by the vitamin A palmitate, and the resulting mixture is emulsified in an Eppenbach emulsifier. The resulting emulsion is sprayed through a two-phase atomizing nozzle into 720 ml. of a 95% ethanol catch maintained with stirring at a temperature of about 15° C. The droplets are maintained therein until the resulting beadlets become hard, i.e. are "sandy" to the touch. This occured after about 45 minutes. Then the beadlets are filtered from the alcohol, washed with 95% alcohol and dried for about fifteen hours in a vacuum oven.

*Examples 2 and 3*

The following ingredients are employed:

| Ingredients | Grams | |
| --- | --- | --- |
| | Example 2 | Example 3 |
| Gelatin, 40 bloom, type B | 43.50 | 37.60 |
| Ascorbic acid, coarse | 13.00 | 11.28 |
| Water | 43.50 | 37.60 |
| Sodium citrate | 3.00 | 2.22 |
| Vitamin A palmitate | 30.00 | 23.00 |
| Butylated hydroxy toluene | 6.56 | 5.00 |
| 70% sorbitol | 36.00 | 26.00 |
| Corn syrup, 80% solids | 62.50 | 46.00 |

The above formulations are prepared according to the process of Example 1. The products are stable and soluble in cold water.

*Example 4*

The formulation and process of Example 3 are repeated except that a mixture of 6.00 grams of sorbose and 6.00 grams of citric acid is employed in place of the ascorbic acid. The product is stable and soluble in cold water.

Variations of the process of the invention can be undertaken without departing from the scope or spirit of the invention.

We claim:

1. A composition of matter comprising (a) a fat-soluble vitamin-active material, (b) the reaction product of gelatin and from about 10 to about 50 parts of a substance selected from the group consisting of ascorbic acid, a mixture of ascorbic acid and citric acid containing not less than 10 parts of ascorbic acid, and a mixture of citric acid and sorbose containing not less than 20 parts of citric acid and 10 parts of sorbose, the above parts being based on 100 parts by weight of gelatin.

2. A composition according to claim 1 which contains from about 3 to about 35% of a fat-soluble vitamin-active substance, and from about 25 to about 97% of said reaction product, based on the total weight of said composition.

3. A composition of matter according to claim 2 wherein the gelatin has a bloom of from about 30 to about 100.

4. A composition of matter according to claim 2 which contains from about 1 to about 40% by weight of a pharmaceutically acceptable polyhydric alcohol plasticizer based on the weight of said composition.

5. A composition of matter comprising from about 10 to about 30% of a fat-soluble vitamin-containing material, from about 30 to about 65% of the reaction product of (a) gelatin and (b) from about 20 to about 40 parts of a substance selected from the group consisting of ascorbic acid, a mixture of ascorbic acid and citric acid containing at least 10 parts of ascorbic acid, and a mixture of citric acid and sorbose containing at least 20 parts of citric acid and 10 parts of sorbose, the parts being parts by weight based on 100 parts of gelatin, and from about 25 to about 40% of a pharmaceutically acceptable polyhydric alcohol plasticizer; said gelatin being a type B gelatin having a bloom in the range of about 40 to about 50.

6. A composition according to claim 5 wherein the plasticizer is corn syrup.

7. A process comprising the steps of (a) heating together at a temperature of from about 50 to about 85° C. an aqueous solution of gelatin and from about 10 to about 50 parts of a substance selected from the group consisting of ascorbic acid, a mixture of ascorbic acid and citric acid containing not less than 10 parts of ascorbic acid, and a mixture of citric acid and sorbose containing not less than 20 parts of citric acid and 10 parts of sorbose, the above parts being based on 100 parts of gelatin, while maintaining the pH of the solution in the range of about 3.5 to about 7, (b) emulsifying a fat-soluble vitamin-active material into the resulting solution, (c) forming droplets of said emulsion, (d) introducing said droplets into an alcohol catch maintained at a temperature range of from −50° to +20° C., (e) maintaining the droplets in alcohol at a temperature in the range of from about 0° to about 20° C. until the droplets become hard, and (f) removing the resulting droplets from the alcohol catch.

8. A process according to claim 7 wherein from about 3 to about 35% of a fat-soluble vitamin-active material is employed based on the dry weight of the product.

9. A process according to claim 8 wherein from about 1 to about 40% of a pharmaceutically acceptable polyhydric alcohol plasticizer is added to the mixture prior to the spraying step.

10. A process according to claim 8 wherein said alcohol catch is an alcohol selected from the group consisting of ethyl alcohol and isopropyl alcohol.

11. A process for preparing cold water-dispersible beadlets comprising the steps of (a) heating together an aqueous solution containing from about 30 to about 70% by weight of gelatin and from about 10 to about 50 parts by weight, based on 100 parts by weight of gelatin, of a substance selected from the group consisting of ascorbic acid, a mixture of ascorbic acid and citric acid containing not less than 10 parts of ascorbic acid, and a mixture of citric acid and sorbose containing not less than 20 parts of citric acid and 10 parts of sorbose, at a temperature in the range of from about 65° to about 80° C., (b) adding to the aqueous solution from about 3 to about 35%, based on the dry weight of beadlets, of a fat-soluble vitamin-active material and forming an emulsion thereof, (c) adjusting the pH within the range of about 3.5 to about 7.0, (d) forming droplets and allowing them to fall into an alcohol catch selected from the group consisting of ethyl and isopropyl alcohols maintained at a temperature in the range of from about 10° to about 20° C., (e) maintaining the droplets in alcohol at a temperature in the range of about 10° to about 20° C. until the droplets become hard, and (f) separating the resulting beadlets from the alcohol.

12. The process of claim 11 wherein ascorbic acid is employed.

13. A process according to claim 12 wherein from about 40 to about 60% of type B gelatin having a bloom in the range of from about 40 to about 60 is employed.

14. A process according to claim 13 wherein the vitamin-active material is selected from the group consisting of vitamin A, vitamin D, vitamin E, vitamin K, and β-carotene.

15. A process according to claim 13 wherein from about 25 to about 40%, based on the weight of dry product, of a pharmaceutically acceptable polyhydric alcohol plasticizer is employed in the composition prior to the droplet formation.

16. A process according to claim 15 wherein at least twenty liters of alcohol catch is employed per liter of water in said emulsion, and the alcohol catch is selected from the group consisting of ethyl alcohol and isopropyl alcohol which contain no more than 5% by volume of water.

References Cited in the file of this patent
UNITED STATES PATENTS

| | | |
|---|---|---|
| 2,218,591 | Taylor | Oct. 22, 1940 |
| 2,218,592 | Taylor | Oct. 22, 1940 |
| 2,224,167 | Stokes et al. | Dec. 10, 1940 |
| 2,756,177 | Cannalonga et al. | July 24, 1956 |
| 2,819,970 | Steigmann | Jan. 14, 1958 |
| 2,824,807 | Laster et al. | Feb. 25, 1958 |
| 2,828,206 | Rosenberg | Mar. 25, 1958 |
| 2,841,498 | Cahn et al. | July 1, 1958 |
| 2,897,119 | Dunn | July 28, 1959 |
| 2,937,091 | Rosenberg | May 17, 1960 |